US008820375B2

(12) United States Patent
Cerny

(10) Patent No.: US 8,820,375 B2
(45) Date of Patent: Sep. 2, 2014

(54) METHOD AND APPARATUS FOR IMPROVED TREAD SPLICING

(71) Applicant: Bridgestone Bandag, LLC, Muscatine, IA (US)

(72) Inventor: Andrew D. Cerny, Riverside, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 30 days.

(21) Appl. No.: 13/713,079

(22) Filed: Dec. 13, 2012

(65) Prior Publication Data

US 2013/0101802 A1 Apr. 25, 2013

Related U.S. Application Data

(62) Division of application No. 12/696,994, filed on Jan. 29, 2010, now Pat. No. 8,357,254.

(51) Int. Cl.
*B60C 11/12* (2006.01)
*B29D 30/54* (2006.01)
*B29D 30/56* (2006.01)

(52) U.S. Cl.
CPC ............... *B60C 11/12* (2013.01); *B29D 30/54* (2013.01)
USPC ...................... 152/209.18; 152/209.6; 156/96

(58) Field of Classification Search
USPC .................. 156/96, 128.1, 406.4; 152/209.6, 152/209.17, 209.18
See application file for complete search history.

(56) References Cited

U.S. PATENT DOCUMENTS

| 2,165,841 | A | | 7/1939 | Ernst |
| 3,753,821 | A | * | 8/1973 | Ragen ............................. 156/96 |
| 3,874,974 | A | | 4/1975 | Simmons, Jr. |
| 3,984,211 | A | | 10/1976 | Hawkins |
| 4,075,047 | A | | 2/1978 | Brodie |
| 4,082,592 | A | | 4/1978 | Raabe |
| 4,234,370 | A | | 11/1980 | McDonough |

(Continued)

FOREIGN PATENT DOCUMENTS

| JP | H06-262704 | 3/1993 |
| JP | H06-262703 | 9/1994 |

(Continued)

OTHER PUBLICATIONS

Machine-generated English language translation of JP 2007-106258 (original document dated Apr. 2007).*

(Continued)

*Primary Examiner* — Martin Rogers

(57) ABSTRACT

A tread for use in a tire retread process includes a first side and a second, flat side. A plurality of lugs is formed on a first side of the tread and arranged along in a periodically repeating tread pattern. A set of marks is formed in at least one outer lug and defines a finite linear distance along the tread within which the tread is adapted to be cut into the length of tread, such that when the length of tread is deposited around the casing of the tire and the ends of the length of tread are placed in abutting relationship one relative to the other along a seam, the periodically repeating tread pattern appears substantially continuous. The set of marks is predetermined in advance of retreading to be located in positions where at least some of the performance and processing characteristics of the tread may be improved.

5 Claims, 5 Drawing Sheets

(56) References Cited

U.S. PATENT DOCUMENTS

| | | |
|---|---|---|
| 4,306,607 A | 12/1981 | Curry |
| 4,667,717 A * | 5/1987 | Graas ................ 152/209.18 |
| 4,836,877 A | 6/1989 | Perdue |
| 4,909,873 A | 3/1990 | Detwiler |
| 4,913,018 A | 4/1990 | Bailey |
| 5,204,036 A | 4/1993 | MacMillan |
| 5,238,041 A | 8/1993 | Tomita |
| 5,427,636 A | 6/1995 | Chabin |
| 5,725,703 A | 3/1998 | Gerloff |
| 6,408,911 B1 * | 6/2002 | Tanabe et al. ........... 152/209.5 |
| 6,655,438 B2 | 12/2003 | Trochon |
| 6,758,931 B1 | 7/2004 | Daugherty |
| 6,841,017 B2 | 1/2005 | Usami |
| 6,899,778 B1 | 5/2005 | Gridley |
| 6,928,911 B1 | 8/2005 | Ratkus |
| 7,152,648 B2 | 12/2006 | Usami |

FOREIGN PATENT DOCUMENTS

| | | | | |
|---|---|---|---|---|
| JP | 09-070903 A | | 3/1997 | |
| JP | 11-186439 A | | 7/1999 | |
| JP | 2001-354008 | | 6/2000 | |
| JP | 2000-247112 | * | 9/2000 | ............ B60C 11/12 |
| JP | 2003-225955 A | | 8/2003 | |
| JP | 2007-22361 | * | 2/2007 | ............ B60C 11/12 |
| JP | 2007-106258 | * | 4/2007 | ............ B60C 11/12 |
| JP | 2008-68646 | * | 3/2008 | ............ B60C 1/12 |
| KR | 10-1987-0001024 A | | 3/1987 | |
| KR | 10-1999-0046189 A | | 7/1999 | |
| KR | 10-0516783 B1 | | 9/2005 | |

OTHER PUBLICATIONS

Machine generated English language translation of JP 2007-22361 (original document dated Feb. 2007).*

Machine generated English language translation of JP 2000-247112 (original document dated Sep. 2000).*

Jae Hyun So, International Search Report and Written Opinion of the International Searching Authority, PCT Application US2011/022391, Oct. 29, 2012, pp. 1-8, Korean Intellectual Property Office, Daejeon, Republic of Korea.

Kopp, C., Extended European Search Report in European Patent Application No. 11861957.8, Dec. 2, 2012, 7 pp., European Patent Office, Munich, Germany.

* cited by examiner

METHOD AND APPARATUS FOR IMPROVED TREAD SPLICING

CROSS-REFERENCE TO RELATED APPLICATIONS

This patent application is a divisional of co-pending U.S. patent application Ser. No. 12/696,994, filed Jan. 29, 2010.

BACKGROUND OF THE INVENTION

The invention relates generally to a method and apparatus for making retreaded tires and, more particularly, to a method of and apparatus in which preformed treads may be consistently cut to lengths that provide for improved splicing while maintaining continuous and repeatable patterns across varying retreading conditions.

Retreaded tires provide an economical way to gain additional use from tire casings after the original tread or retread has become worn. According to a conventional method of retreading, sometimes referred to as cold process retreading, worn tire tread on a used tire is removed to create a buffed, generally smooth treadless surface about the circumference of the tire casing to which a new layer of tread may be bonded.

The tire casing is then typically inspected for injuries, some of which may be skived and filled with a repair gum while others may be severe enough to warrant rejection of the casing. After completion of the skiving process, the buffed surface may be sprayed with a tire cement that provides a tacky surface for application of bonding material and new tread. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Following assembly of the tire casing, cement, cushion gum and tread, the overall retreaded tire assembly may be placed within a flexible rubber envelope. An airtight seal may be created between the envelope and the bead of the tire. The entire envelope tire assembly may be placed within a curing chamber and subjected to a vulcanization process that binds the materials together.

Portions of the above-described method of cold process retreading may be accomplished on a tire builder. Tire builders may include spindles on which a tire and a roll of cushion gum may be mounted. In such tire builders, the cushion gum may be dispensed by hand as the tire is rotated to adhere the cushion gum to the tire casing. After the cushion gum has been applied, the circumference of the tire casing with cushion gum may be measured and an applicable length of tread may be cut.

In such tire building systems, a length of tread is applied to the cushion gum and casing. Variability in the cut length of the tire tread typically requires manipulation of the tread segment around the perimeter of the tire casing and cushion gum to create an appropriately sized splice in which both ends of the tread length abut one another. It is often desirable, for aesthetic and performance purposes, to match the tire tread design at each end of the tire tread length so that where the two ends of the tire tread length match at the splice, the repetitive pattern of the tire tread design is substantially continuous.

The complication and difficulty of such procedures is increased because the tread patterns are subject to varying characteristics depending on the cut location. For instance, from a cross-sectional perspective, the tread end surfaces may have varying total surface area quotients, varying amounts of surface area farther from the center of rotation of the tire and closer to the contact surfaces, etc. In the bonding process, such parameters of the multi-dimensional profile of the tread splice may provide for improved operation in the vulcanization process, particularly in relation to use of envelopes and pressure.

Various devices and methods for cutting a tread length to an appropriate size have been proposed in the past. For example, U.S. Pat. No. 6,899,778 (the '778 patent), the contents of which are incorporated herein in their entirety by reference, generally describes a tire builder. The machine may include a rotatable hub for mounting of a buffed tire casing and a cushion gum applicator that may be configured to stretch a length of cushion gum onto a tire casing. A tread dispenser may automatically dispense a length of tire tread based on the circumference of the tire casing or the circumference of the tire casing plus the cushion gum. Thereafter, a tread applicator of the machine may manipulate the length of tire tread onto the cushion gum to accommodate variability in measurements, cutting, etc.

Machines such as described in the '778 patent may rely on semi-automatic or automatic processes when determining what length of tread is appropriate for a particular casing. Such processes typically include measurements providing information indicative of the circumference of the casing as well as the length of tread that is dispensed from a roll. When an approximate length of tread has been dispensed to match the measured circumference of the casing, a manual cutting operation is typically employed to sever a length of tread.

In previously proposed retreading machines and operations, variability in the measurements of the circumference of the casing or of the dispensed length of tread all too often resulted in dimensional variations when cutting the length of tread. Manual intervention in the cutting process of the length of tread to provide a substantially uninterrupted tread pattern around the entire periphery of the retreaded tire is not only inaccurate, but also compounds the dimensional variability in determining the appropriate length of tread that is required. Such intervention often fails to account for the characteristics of the cross-sectional tread and improving the characteristics of the abutting ends of the tread for performance and bonding characteristics. The inaccuracy of the manual cutting operation in matching the tread pattern may adversely affect the service life and aesthetic appeal of the final retreaded tire. In certain instances, the compounded variability in cutting the appropriate length of tread may make the length of tread unsuitable for use on a retreaded tire, thus necessitating the cutting of an additional length. Such rework operations are time consuming, increase the cost of the retreading operation, increase waste, and so forth.

BRIEF SUMMARY OF THE INVENTION

The present disclosure provides an improved method and apparatus for manufacturing retreaded tires under varying conditions, where the encased tread still maintains a continuous and consistent tread design while decreasing variability and increasing retread tire performance and bonding characteristics. The improvements described herein advantageously enable retreading in a more efficient and cost effective fashion to produce retreaded tires that have an improved aesthetic appearance, improved performance and improved bonding.

For purpose of illustration and to more fully describe the advantages afforded to the tire retreading process by use of the improved method and apparatus for tread splicing, the present disclosure is made using as example a retreading machine to place the improved tread of the invention in context, but it should be appreciated that the disclosed embodiments of the improved tread, as well as the methods disclosed herein, are applicable to any other manual, automatic, or semi-automatic retreading process as will become evident after considering the description below.

In one aspect, the disclosure describes a method of cutting a length of precured tread for the construction of a retread tire, which includes a tire casing having a layer of cushion gum applied thereto. The method includes measuring a circumference of the tire casing and cushion gum, and dispensing a length of tire tread from a roll based on the measured circumference. The length of tire tread relative to a tread cutter is adjusted so that the tire tread design may be spliced to provide a continuous pattern. The points where the precured tread may be cut are generally located between a set of marks formed in precured tread. The marks provide locations where the cut of the tread will permit for formation of a continuous tread pattern across the ultimate splice and also provide for improved performance and bonding. For example, the marks permit consistent cutting and splicing along tread profiles that improve, among other things, the bonding characteristics and the performance characteristics. The marks permit for pre-evaluated location determination taking into consideration the operational characteristic of the retreaded tire and the process by which it is constructed. The marks include areas of variation or tolerance that provide for the variability in operation without substantially adversely affecting the ultimate retreaded tire and process of construction.

In certain embodiments, more than one set of marks may be provided. The invention provides marks that may be differentiated thereby facilitating greater flexibility in the cutting, especially when considered in the varying circumferential measurements of the tire casing assemblies. The result is a significant improvement in the final retreaded tire, its performance, the bonding procedure during manufacture, etc. Furthermore, the invention removes variation, unpredictability, and waste from prior operations.

BRIEF DESCRIPTION OF THE SEVERAL VIEWS OF THE DRAWING(S)

DETAILED DESCRIPTION OF THE INVENTION

Figure 1:
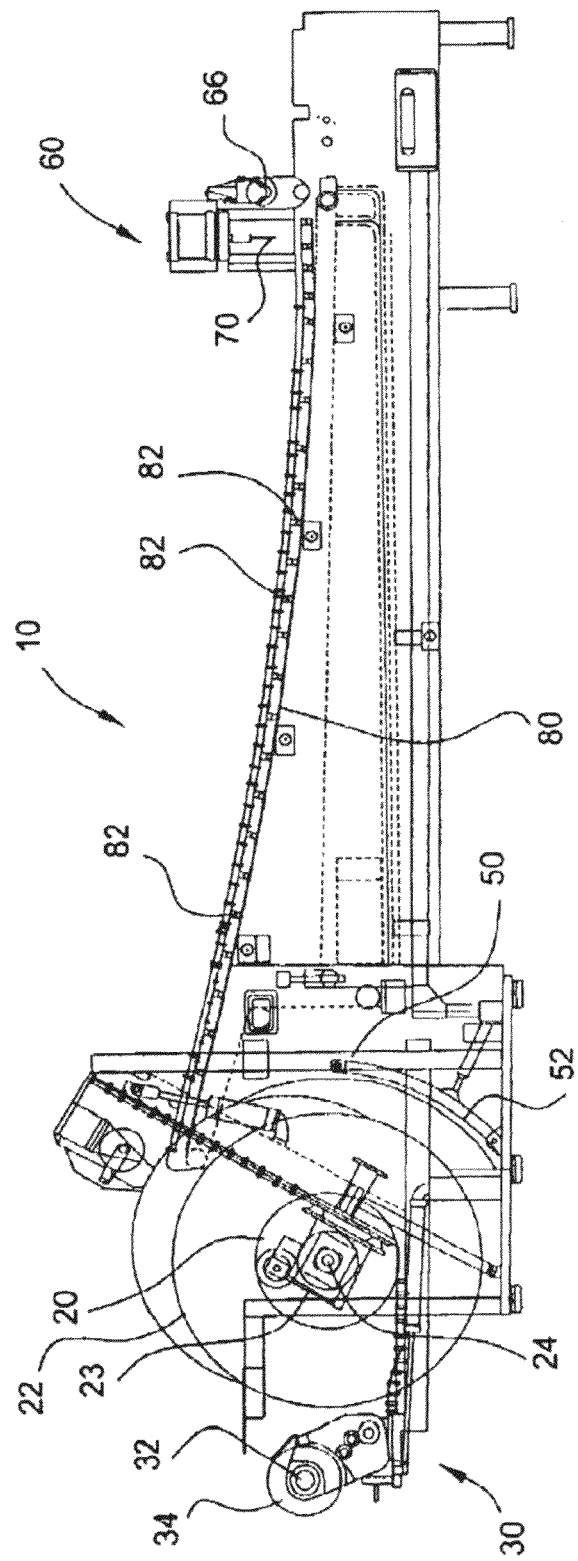
FIG. 1 is a side view of an exemplary retreading machine using a tread in accordance with the disclosure.
Figure 2:
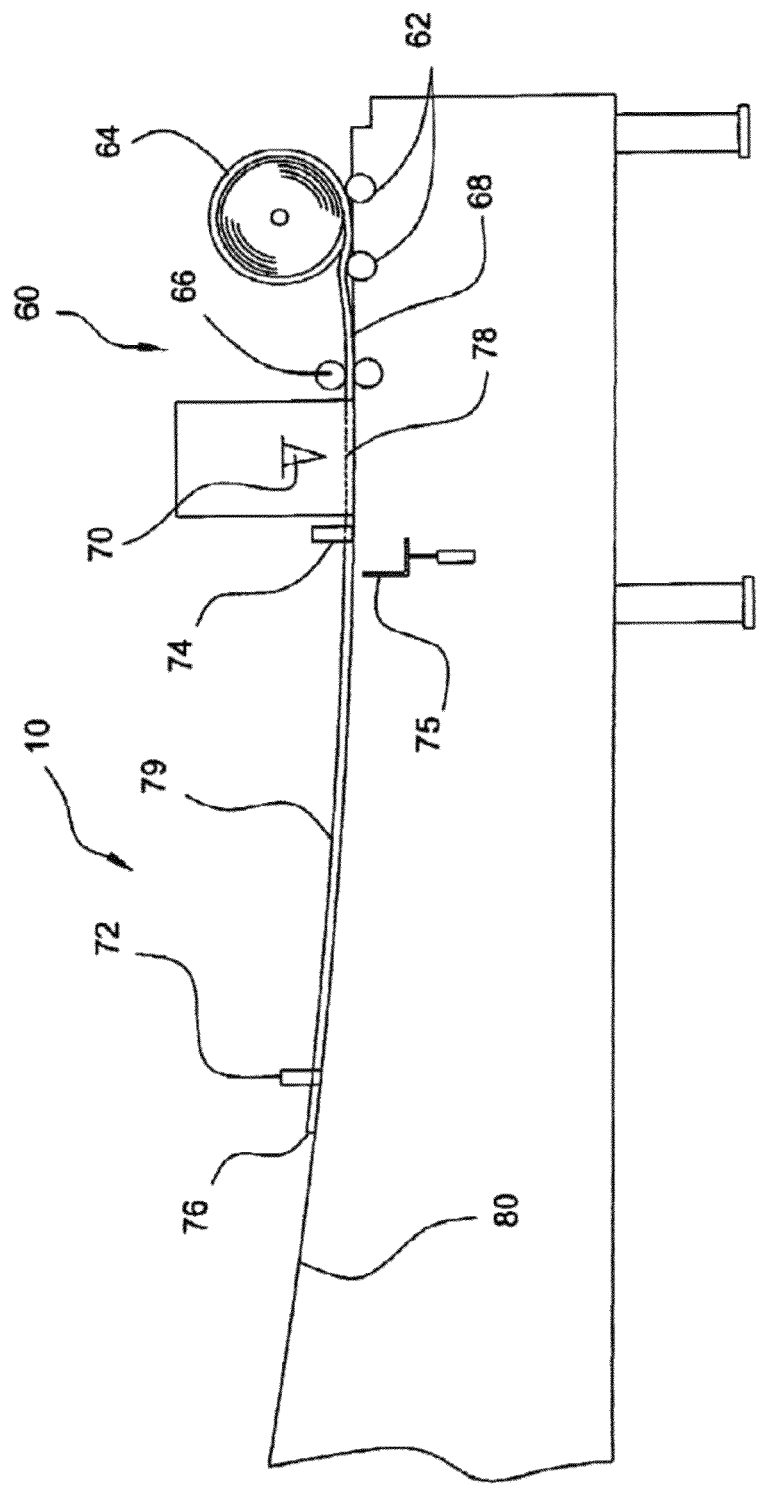
FIG. 2 is a detail view of the retreading machine of FIG. 1.

A retreading machine or integrated tire bench 10 is shown from a side view in FIG. 1, and a detailed view thereof is shown in FIG. 2. In the illustrated example, the tire bench 10 is a semi-automated retread tire building apparatus configured to assemble retread tires. The tire bench 10 includes a rotatable hub 20 for mounting a tire casing thereon, and a cushion gum applicator system 30 having a spindle 32. A roll of cushion gum 34 may be mounted on the spindle 32 and dispensed onto a tire casing 22 mounted on hub 20.

The tire bench 10 may include a device for measuring the circumference of the casing 22 mounted thereon. In the illustrated example, a measurement wheel 50 is provided on a measurement arm 52. Measurement arm 52 is pivotable by actuation, for example, through a pneumatic cylinder, to engage a surface (either a tire casing, or cushion gum applied to a tire casing). Measurement wheel 50 rotates when it comes into contact with the periphery of the rotating tire casing 22, which is arranged to rotate relative to the tire bench 10 about an axis 24. Measurement wheel 50 is coupled to an encoding device (not shown) which encodes the angular variation of measurement wheel 50 for communication to a central processing unit or control unit (not shown).

In combination, wheel 50 with control unit yields a measurement of the circumference of the casing or of the casing with the cushion gum deposited thereon. It can be appreciated that the measurement of the circumference of the casing 22 achieved by the use of the measurement wheel 50, or any other such device, will depend on the accuracy of the encoder used to measure the revolutions of the measurement wheel 50, and will further include variances caused by other factors, such as slippage between the measurement wheel 50 during measurement, sinking of the measurement wheel 50 into the cushion gum due to the engagement force applied to the measurement arm 52, and other factors. Such variations included in the measurement of the circumference of the casing 22 can cause variability in determining the appropriate length of tread that will be required for the casing 22.

The tire bench 10 also includes a tread dispensing system 60. Referring now to FIG. 2, the tread dispensing system 60 includes a set of tread rollers 62 on which a roll of rubber tire tread 64 is rotatably supported and arranged to dispense a length of tread when unrolled. The tread dispensing system 60 also includes a set of drive rollers 66 which may be used to pull tire tread 68 from roll 64 and push out a length of tire tread 79 away from rollers 66. Tread dispensing system 60 also includes a cutter 70 for cutting a length of tire tread 79 from uncut tread 68. The tire bench 10 includes two clamps 72 and 74 to move the length of tire tread 79 from the roll 64 to the casing 22. Each clamp 72 and 74 has a translational encoder associated therewith that communicates with the central processing unit (not shown). The first clamp 72 is configured to clamp tire tread 68 at or near a first end 76. The second clamp 74 is configured to clamp tire tread 68 at or near a second end 78, which is created when the cutter 70 is activated to cut the length of tire tread 79 from the roll 64.

Tire bench 10 includes a curved track 80, which in the illustrated example includes a set of rollers 82 that are mounted along the curved track 80 and configured to deliver tire tread section 79 to the end of track 80 adjacent casing 22, for assembly thereon. During operation, the first clamp 72 pulls tread section 79 along track 80 to provide tread section 79 to contact casing 22. As tread section 79 is applied to tire casing 22, second end 78 is at a known location because clamp 74 includes the encoder, which is configured to track the location of end 78 relative to end 76 which is engaged with casing 22.

The encoders of clamps 72 and 74 are not limited to receiving data every millimeter but may be configured to receive information on larger or smaller scales, thus providing a substantially continuous location signal to a central processing unit or control unit used to control the application process. However, variations in the absolute and relative position measurements provided by the encoders can be a source of variability when determining the appropriate length of tire tread to be cut. For example, dimensional variances in the engagement and/or slippage between the clamps 72 and 74 with the length of tire tread 79, offset variability in the measurement of the encoders, the accuracy and resolution of the encoders, are but a few potential sources of variability in the measurement of the length of the tire tread 79.

In operation, an operator mounts a tire casing 22 to hub 20, centers it relative to the centerline of the cushion gum 34 and tire tread roll 64, and inflates it. Next, measurement wheel 50 is brought into contact with the outer surface of casing 22. The tire casing 22 is rotated to provide a measurement of the circumference of casing 22. While casing 22 is rotated a full revolution, measurement wheel 50 encodes rotations of measurement wheel 50 which are communicated to a central processing unit or control unit where a determination of the circumference of tire casing 22 is calculated subject to the errors and variations previously discussed.

Next, a length of cushion gum is dispensed from roll 34 and applied to the surface of casing 22 and the measurement of the circumference of the casing 22 using measurement wheel 50 as previously discussed. Based on the measured circumference of tire casing 22 with cushion gum layer 34 adhered thereto, a desired length of tire tread may be determined. In an exemplary embodiment, the determined length is dispensed from tread roll 64, as depicted in FIG. 2. The tread 68 is dispensed by drive rollers 66 beneath a retracted cutter 70 and through clamps 72 and 74 to a stop 75 which is extended upwardly above track 80. When end 76 engages stop 75, clamp 72 is selectively commanded to engage tread section 79 (adjacent end 76) to carry tread 79 along with movements of clamp 72. Stop 75 is then lowered and based on a determined length, roller 66 drives tread 68 pushing end 76 along track 80 and past clamp 74, while clamp 72 cooperatively propels tread end 76 along track 80. When an approximate desired length has been reached, based on aforementioned circumferential measure, drive 66 stops deploying tread 68 and clamp 72 stops propelling tread end 76.

As discussed above, the determination of the appropriate length of the length of tire tread 79 often includes variations and errors. Once the approximate length of tread has been deployed from the roll 64, these variations may be compounded by the adjustments to a location of cut 78 in tread 68 made by an operator for matching the tread pattern of the first and second ends 76 and 78 of the tread 79 meet around the casing 22.

Figure 3:
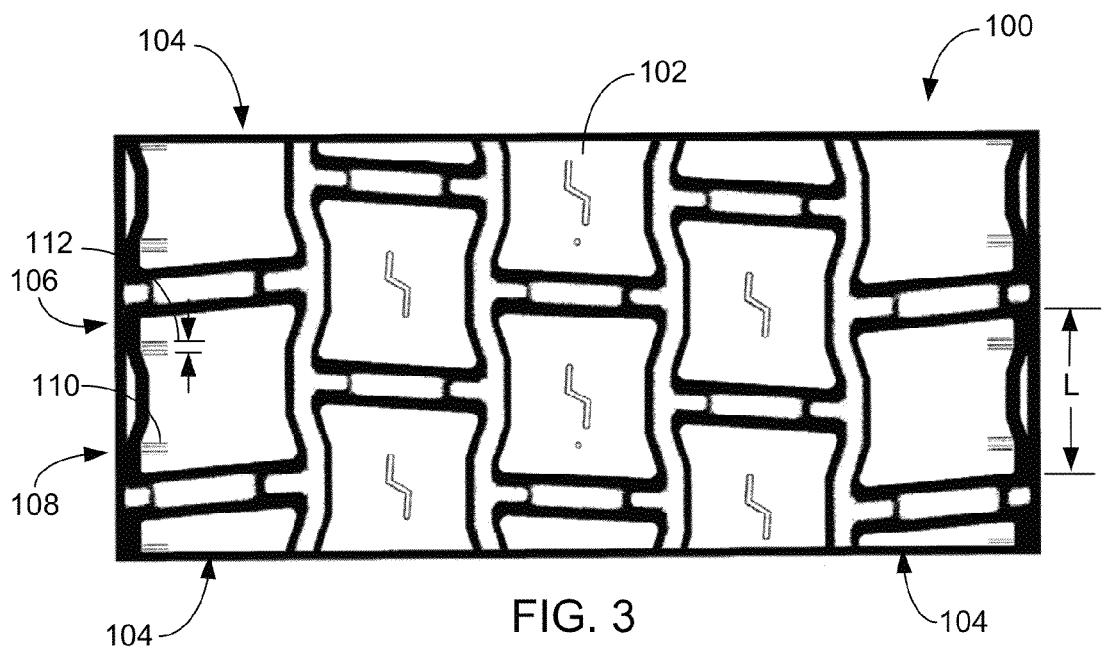
FIG. 3 is a schematic of a tread pattern in accordance with the disclosure.
Figure 4:
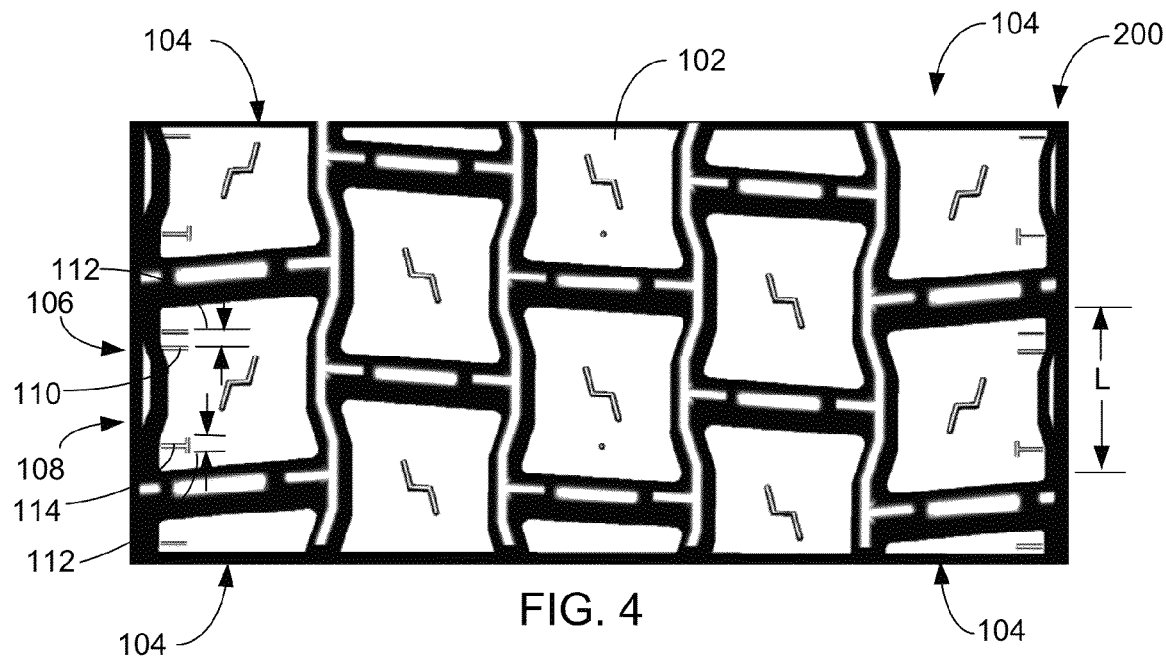
FIG. 4 is a schematic of an additional embodiment of a tread pattern in accordance with the disclosure.

These and other similar problems are solved by use of the improved tread patterns 100 and 200 shown in FIGS. 3 and 4, respectively. In the description that follows, elements and features that are the same or similar are denoted in the illustrations and described using the same reference numerals for simplicity. The tread patterns 100 and 200 may appear and repeat along the entire length of tread forming the roll 64 (FIG. 2) along a side thereof that faces the operator during operation. As is typical, the other side of the tread, i.e. the side of the tread that will contact the cushion gum, may be generally flat or include features that will improve its adhesion.

The tread patterns 100 and 200 include a series of lugs 102 arranged in repeating patterns and separated by a network of grooves 103. The shape, size, and arrangement of the lugs 102 and grooves 103 may differ in equivalent tread patterns 100 and 200. More importantly, each of the tread patterns 100 and 200 includes two rows of outer lugs 104, each of which is disposed along an outer or side edge of the tread pattern 100 or 200. The linear length, L, of each of the outer lugs 104 may be arranged to be a integer-divisor or sub-multiple of one or more circumferential length differences between tires that are suitable for retreading using the tread pattern 100 or 200.

Each of the outer lugs 104 of the tread patterns 100 and 200 also includes two sets of marks 106 and 108. For purpose of discussion, it is assumed that the roll 64 unrolls such that the mark 106 is leading and the mark 108 is trailing, although the opposite direction may be used. As shown in FIG. 3, the marks 106 and 108 are the same as one another, with each mark being defined by two shallow, linear slits 110 that extend parallel to one another in a transverse direction that is perpendicular to the tread pattern 100. The two linear slits 110 are shallower than the network of grooves 103.

A gap 112 is defined between each set of two slits 110. As shown, the gap 112 extends along the linear length L of the tread pattern 100, and there are two gaps 112 defined on each outer lug 104. It is noted that although the slits 110 are formed along the outer edge portion of each outer lug 104, alternate placement along the outer lug 104 or any of the lugs 102 of the tread pattern 100 may be used. The gap 112 of the leading and trailing splice marks 106 and 108 is the same, although it is contemplated that the gap 112 in one mark may be different from the other.

Figure 5:
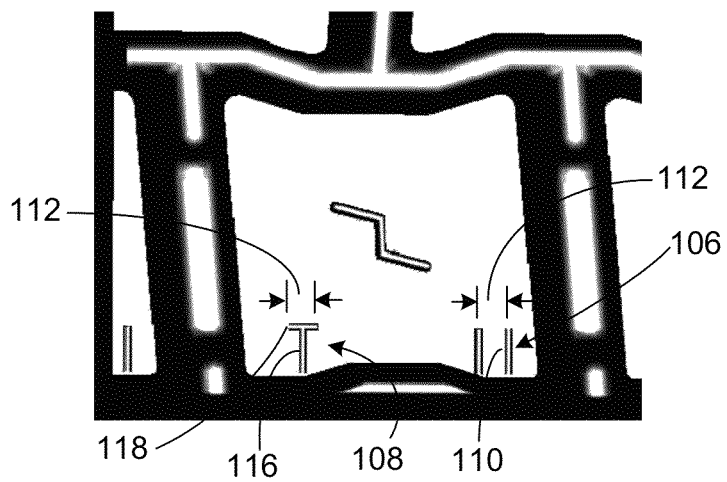
FIG. 5 is a detail view of the tread pattern of FIG. 4.

In the embodiment for the tread pattern 200 shown in FIG. 4, and in reference to a detailed view thereof shown in FIG. 5, the leading marks 106 are different than the trailing mark 108. As shown, the leading marks 106 are defined by two linear slits 110 defining the gap 112 therebetween in a fashion similar to that of the tread pattern 100 shown in FIG. 3. However, the trailing mark 108 is different to readily enable its visual distinction from the leading splice marks 106. In this embodiment, the trailing splice mark 108 is generally T-shaped and is denoted in this embodiment by reference numeral 114 in FIGS. 4 and 5.

As best shown in FIG. 5, the T-shaped trailing splice mark 114 may be formed by two slits that perpendicularly intersect one another. More specifically, a base slit 116 extends perpendicular to the linear length of the tread 200 (and also parallel to the slits 110 defining the leading splice marks 106). A cross slit 118 extends perpendicularly with respect to the base slit 116, which intersects the cross slit 118 to form the T-shape. The length of the cross slit 118 is arranged to be the same or about the same as the gap 112 defined between the two slits 110 of the leading splice marks 106.

Although two sets of marks 106 and 108 are illustrated for each of the tread patterns 100 and 200, a single set of marks or more than two sets may be used. In use, the roll 64 of tire tread (FIG. 2) may be cut anywhere within the gap 112 (FIG. 3, 4, or 5) to ensure that the length of tire tread 79 (FIG. 2) thus produced is not only suited for acceptable matching of the tread pattern when rolled around the casing 22 (FIG. 1), but will also yield improved adhesion at the resulting splice and, thus, produce a retread tire having improved performance characteristics. In other words, by appropriately placing the splice marks, for example, 106 and 108, in the tread pattern 100 or 200, by appropriately arranging the width of the gap 112, and by cutting the length of tire tread 79 within the gap 112, the tread pattern of a retreaded tire that incorporates the length of tire tread 79 thus produced will be within the appropriate range for both aesthetic purposes and, more importantly, reliability purposes. Proper matching of the tread pattern is especially desirable for severe service tire applications, such as high speed or high load applications.

Depending on the arrangement of the lugs on a tread pattern, for example, the lugs 102 in the tread patterns 100 and 200, a finite number of cut locations that will yield a uniform tread pattern in the retreaded tire while also providing improved adhesion at the splice may be present and improved performance. In the exemplary embodiments for the tread pattern 100 or 200 shown in FIGS. 3 and 4, there are only two such locations as is discussed in more detail below relative to FIG. 7. Thus, each tread pattern 100 or 200 is provided with two sets of marks, each providing an acceptable range for a cut zone within each gap 112. It can be appreciated that a different tread pattern may include a single acceptable cut zone or more than two acceptable cut zones, depending on the pre-determined improved nature of the cut zones.

For tread patterns having more than a single set of marks, it is important to ensure that the cut severing the length of tire tread 79 from the roll 64 is performed using the same splice mark as was used to create the other end of the tread. For example, and in reference to FIG. 6, proper matching of the tread pattern around a tire will result if both cuts on the ends of the length of tire tread 79 are performed using the mark, in this case mark 106 as shown, that is similarly situated on the corresponding outer lug 104 relative to the tread pattern. The existence of more than one possible location at which the tread may be cut has the added advantage of reducing material waste during the retreading process. For instance, a roll 64 used for the first time may require the cutting of its free end to create a clean, first end of a length 79. The more opportunities per tread pitch that exist on the pattern, the shorter the length of the scrap piece generated by this first cut can be.

A further advantage of the tread patterns having splice marks in accordance with the present disclosure is the facilitation of inspection of a retreaded tire. In reference to FIG. 6, a splice 300 is shown along an interface of the two ends 76 and 78 of a length of tire tread 79 that has been wrapped around a casing. In the illustrated embodiment, the splice 300 is secured by a plurality of staples 302. As shown, the length of tire tread 79 was generated by cuts performed along corresponding leading marks 106. Thus, slits 110 belonging to the two cut leading marks 106 come together and meet to define a mark 304 that surrounds the splice 300. During an inspection operation performed to determined the quality of the splice, a gap 306 defined between the slits 110 of the mark 304 may be simply measured and compared to a predetermined, acceptable value, for example, the width of the gap 112, to determine whether the matching of the tread pattern at the splice 300 is acceptable.

Figure 7:
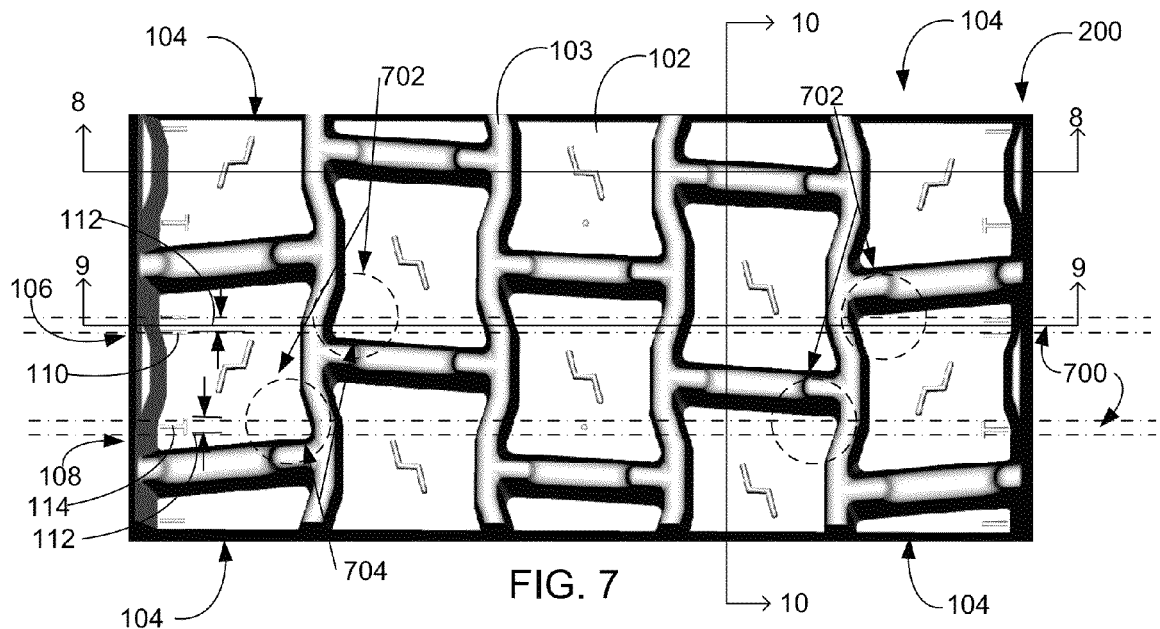
FIG. 7 is a schematic of a tread pattern in accordance with the disclosure that includes additional reference information.

Turning now to FIG. 7, which illustrates a schematic of the tread pattern 200, it can be seen that each gap 112 defines a zone 700 within which the tread 200 may be cut to produce an improved splice in both appearance and performance. More particularly, an improved splice is one that yields improved conditions for bonding of the tread during the curing process of the retread tire and improved conditions for improving adhesion of the tread during service while still maintaining apparent uniformity and continuity in the tread pattern in the area of the splice. The cross sections shown in FIGS. 8-10 illustrate certain factors that may be considered and optimized to achieve improved bonding of the tread during the manufacture of a retread tire, as well as to maintain improved adhesion of the tread during service.

Figure 8:
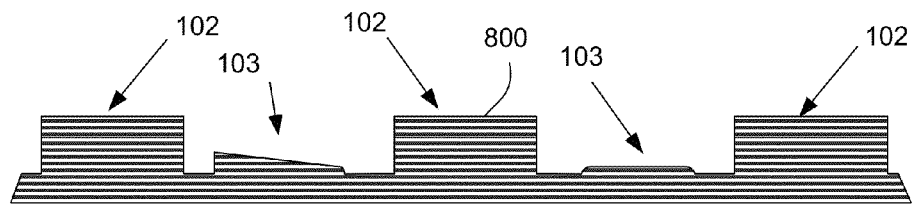
FIG. 8 is a schematic illustration of profiles that might result from cuts near the line 8 represented in FIG. 7.
Figure 9:
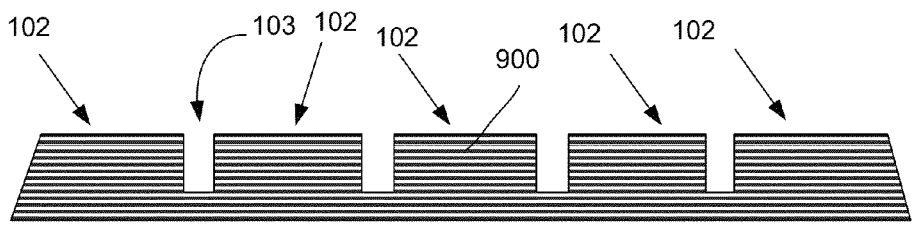
FIG. 9 is a schematic illustration of profiles that might result from cuts near the line 9 represented in FIG. 7.
Figure 10:
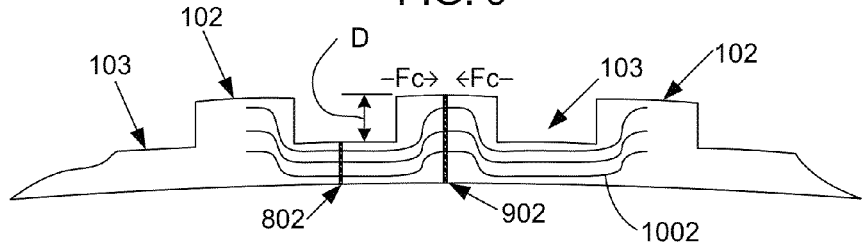
FIG. 10 is an illustration of potential forces through the tread.

Two cross sections of the tread 200 are shown juxtaposed in FIGS. 8 and 9 to illustrate certain differences between improved (FIG. 9) and sub-optimal (FIG. 8) cross sections for creating a splice. As shown, the improved cross section 900 of FIG. 9 is taken within the cut zone 700, while the sub-optimal cross section 800 of FIG. 8 is taken outside of the cut zones 700. One factor affecting adhesion of the tread during service is the contact area between the two ends of the tread that are bonded to one another to form the splice. As can be seen from FIGS. 8 and 9, the improved cross section 900 increases or maximizes the contact area such that stresses and other factors affecting the bonded seam will be reduced. Maximization of the contact area in the cross section 900 is achieved by cutting the tread 200 along the cut zone 700, which has been previously determined and arranged to intersect as many lugs 102 as possible. In contrast, the cross section 800 is taken outside of the cut zones 700 and although it intersects fewer lugs 102, it also intersects and/or follows certain grooves 103. Thus, by cutting the tread 200 within the cut zones 700, the contact area at the splice can be increased to ensure increased bonding and adhesion of the tread. In the illustrated example, the surface area of the cross section 800 is reduced by about 35%, for example, relative to the surface area of the cross section 900.

An additional consideration when selecting an improved cross section for creating the splice relates to the quality of the bond along the seam when curing the tread tire assembly during manufacturing, as well as to the distribution of stresses the seam is expected to experience during service. FIG. 10 is an illustration of a tread cross section that, for purpose of illustration, includes an improved seam 902 and a sub-optimal seam 802. In the illustrated example, the improved seam 902 is disposed within one of the cut zones 700 while the sub-optimal seam 802 is taken at a different location, as shown in FIG. 7, although certain features of the cross section are exaggerated for purpose of illustration.

As is known, a retread tire assembly is placed within an envelope before curing. In certain operations, air within the envelope is removed after the retread tire has been inserted to create a vacuum that shrinks the envelope around the retread tire to provide a compressive force around the outer surfaces of the tread for proper bonding during the curing process, in some instances such surfaces also including a bonding cement or gum between the ends. These compressive forces, which are illustrated qualitatively in FIG. 10 as open headed arrows and denoted as "Fc," are believed to tend to push the seam together. The force Fc is applied along the outermost surfaces of the tread because that is where the tread is in contact with the envelope (not shown), and essentially "pinch" the seam during curing.

It is believed that the closer the surface through which the forces Fc are to the seam, the better adhesion and bonding of the seam may be accomplished. Thus, by selecting the location of the improved seam 902 to intersect the top surfaces of the lugs 102, improved characteristics may be produced. In contrast, the seam 802 has portions that extend within or along grooves 103 to a greater extent relative to the seam 902. Such a portion is illustrated in FIG. 10, which shows that the outermost portion of the seam 802 is disposed at a distance, D, from the surfaces of the tread that are subject to the forces Fc. Thus, the "pinching" effect on the seam 802 from the forces Fc will be reduced or less pronounced than that of the seam 902.

An additional consideration when selecting an improved location for a splice in the tread of a retread tire is the reduction of stresses at the seam during service. In further reference to FIG. 10, a series of illustrative stress curves 1002 is shown that qualitatively represents what is believed to represent the flow of stress through the tread during operation for purpose of illustration. It should be appreciated that the stress curves will be more concentrated along thinner cross sections of the tread, such as along the grooves 103, and will be more distributed along thicker cross sections, such as along the lugs 102. Thus, the portions of the sub-optimal seam 802 that extend along the grooves 103 will be subjected to higher stresses overall, which coupled with the sub-optimal bonding in these portions that was previously described, will lead to an overall inferior robustness of the seam 802 as compared to the seam 902.

Figure 6:
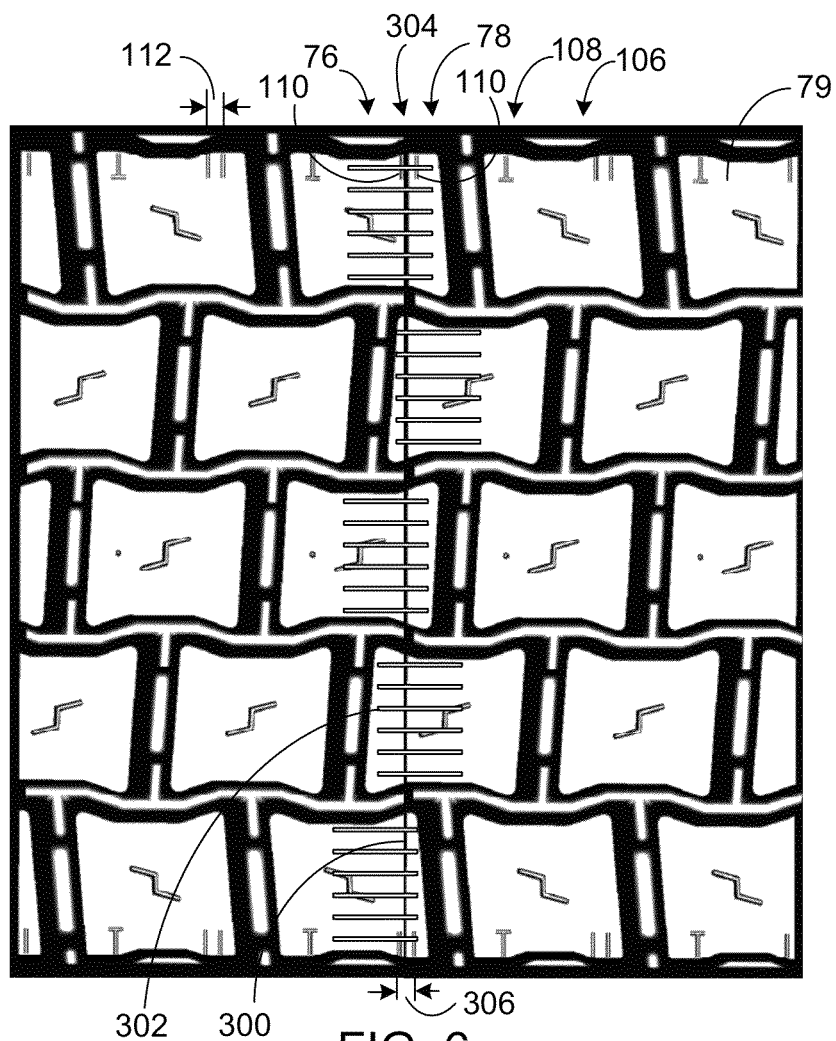
FIG. 6 is a schematic of a seam between two ends of a length of tire tread in accordance with the disclosure.

Based on the foregoing, it is desirable to provide a cross-sectional shape of the tread pattern at the splice that reduces (i.e., minimizes) as well as distributes moments and other stresses present during service of a retread tire uniformly along the face of the splice. In certain instances, such as when stitching a splice using staples as shown in FIG. 6, an improved splice location is one that further provides adequate lug land around the splice. In addition to such performance attributes, an improved splice location is one that may also avoid creating slivers from the edges of the lugs in a tread patterns, such that the tread appears uniform when spliced.

With the foregoing in mind, the zones 700 illustrated in FIG. 7 extend through the entire width of the tread pattern 200 and demarcate the optimal (i.e., improved) cross sections of the tread that are optimal (i.e., improved) for splicing. Two such zones 700 exist for the tread pattern 200, although more than two or a single zone may exist in different tread patterns. The length along the tread pattern 200 of each zone 700 is equal to the gap 112 defined by the splice marks 106 and 108 as previously described.

Each zone 700 as shown in the tread pattern 200 advantageously provides for a splice location that is considered optimal for the specific tread pattern 200. In this particular application, the zone 700 extends along portions of the lugs 120 that have a substantially uniform width such that a cut performed along either of the two zones 700 will not create any slivers of tread material. Moreover, the zones 700 are arranged so as not to track any appreciable distance of the grooves 103, such that surface area of the resulting splice will be maximized (i.e., improved).

In this way, the zones 700 are placed in the locations indicated in FIG. 7 to be within boundary regions 702 of the tread pattern 200, which in this case are the edges 704 of any lugs 102 that are located along the cut path. As can be appreciated, there are two optimal cut zones defined in the tread pattern 200 that are improved insofar as they satisfy as many of the requirements for a proper splicing cut as possible.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as being absolute on a scale but should only indicate relative improvement, nothing should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tread for use in a tire retread process for manufacturing a retread tire, the tread comprising:
   a first side and a second, flat side;
   a plurality of lugs formed on the first side of the tread, the plurality of lugs arranged in a periodically repeating tread pattern and separated by a network of grooves,
   a first set of pre-applied marks formed in the periodically repeating tread pattern, each of the first set of pre-applied marks defined by two linear slits extending parallel to one another transversely relative to the tread, each of said two linear slits being shallower than the network of grooves, and each of said two linear slits having a closed shape and being discrete from any other slits formed in a respective lug on which they are formed, wherein a transverse region along which the tread may be cut is contained within a transversely-extending rectangular zone bounded in the longitudinal direction of the tread by each two linear slits,
   a second set of pre-applied marks formed in the periodically repeating tread pattern, each of the second set of pre-applied marks defined by a base slit extending transversely relative to the tread and a cross slit that is bisected perpendicularly by its base slit to form a T-shape, each T-shape having a closed shape and being discrete from any other slits formed in a respective lug on which it is formed, each of the cross and base slits being shallower than the network of grooves, wherein a transverse region along which the tire tread may be cut is contained within a transversely-extending rectangular zone bounded in the longitudinal directions of the tread by either end of each cross slit,
   wherein each of the first and second sets of pre-applied marks defines a respective finite linear distance along the tread within which a transverse cut can be made across the tread to form one end of a respective length of tread, such that when the respective length of tread is deposited around a casing of the tire and the ends thereof are placed in abutting relationship one relative to the other along a respective seam, the periodically repeating tread pattern appears substantially continuous;
   wherein each of the first and second sets of pre-applied marks are predetermined in advance of retreading to be located in positions where at least some of the performance and processing characteristics of the tread may be substantially improved.

2. The tread of claim 1, wherein the location of the first and second sets of pre-applied marks are pre-determined based in part on substantially maximizing the total surface area of the cross-section of the one end of the tread.

3. The tread of claim 1, wherein the location of the first and second sets of pre-applied marks are pre-determined based in part on increasing the overall performance of a bonding process used to construct the retreaded tire.

4. The tread of claim 1, further comprising an additional set of marks disposed on a transversely opposite location of the tread relative to each first and second set of marks.

5. The tread of claim 1, wherein each of the first and second sets of pre-applied marks is formed on at least one axially outermost lug for each tread pitch.

* * * * *